United States Patent [19]
Kobayashi et al.

[11] Patent Number: 5,842,153
[45] Date of Patent: Nov. 24, 1998

[54] COORDINATES INPUT APPARATUS AND VIBRATION DETECTING APPARATUS

[75] Inventors: Katsuyuki Kobayashi, Yokohama; Atsushi Tanaka, Yamato; Yuichiro Yoshimura, Kamakura; Ryozo Yanagisawa, Inzai; Masaki Tokioka, Fujisawa; Hajime Sato, Yokohama, all of Japan

[73] Assignee: Canon Kabushiki Kaisha, Tokyo, Japan

[21] Appl. No.: 773,886

[22] Filed: Dec. 27, 1996

[30] Foreign Application Priority Data

Jan. 8, 1996 [JP] Japan ................... 8-000516

[51] Int. Cl.$^6$ .......................... G01B 17/00; C08C 21/00
[52] U.S. Cl. .................. 702/95; 178/19; 367/129; 367/127
[58] Field of Search ............ 73/570, 597; 367/127, 367/129, 907; 178/18, 19; 181/400, 401; 364/560, 556, 561; 344/177, 156; 702/95

[56] References Cited

U.S. PATENT DOCUMENTS

| | | | |
|---|---|---|---|
| 4,887,245 | 12/1989 | Mori et al. | 367/129 |
| 4,931,965 | 6/1990 | Kaneko et al. | 364/560 |
| 5,484,967 | 1/1996 | Yanagisawa et al. | 178/19 |
| 5,541,892 | 7/1996 | Kobayashi et al. | 367/127 |

FOREIGN PATENT DOCUMENTS

| | | |
|---|---|---|
| 61-033525 | 2/1986 | Japan . |
| 64068823 | 3/1989 | Japan . |
| 1-114927 | 5/1989 | Japan . |

Primary Examiner—Hezron E. Williams
Assistant Examiner—Rose M. Miller
Attorney, Agent, or Firm—Fitzpatrick, Cella, Harper & Scinto

[57] ABSTRACT

A coordinate input apparatus which can stably input coordinates at a high precision is provided. A vibration sensor is fixed to a vibration propagating plate by means such as an adhesion or the like. Electrodes are formed on both edge surfaces of the vibration sensor. One electrode is connected to the vibration propagating plate (its surface is made of a conductive material). Another electrode is connected to a conductive plate spring through an electrode leading member. The electrode leading member has a cylindrical portion to position a projecting portion to a center axis by setting a side surface of the vibration sensor to a reference has a relation adapted to be come into engagement with the vibration sensor. The plate spring presses the electrode leading member to the vibration sensor and is electrically connected to the vibration sensor. Since the position to extract a signal from the vibration sensor is positioned by setting the side surface of the vibration sensor to a reference, the signal can be stably extracted at a high precision.

38 Claims, 10 Drawing Sheets

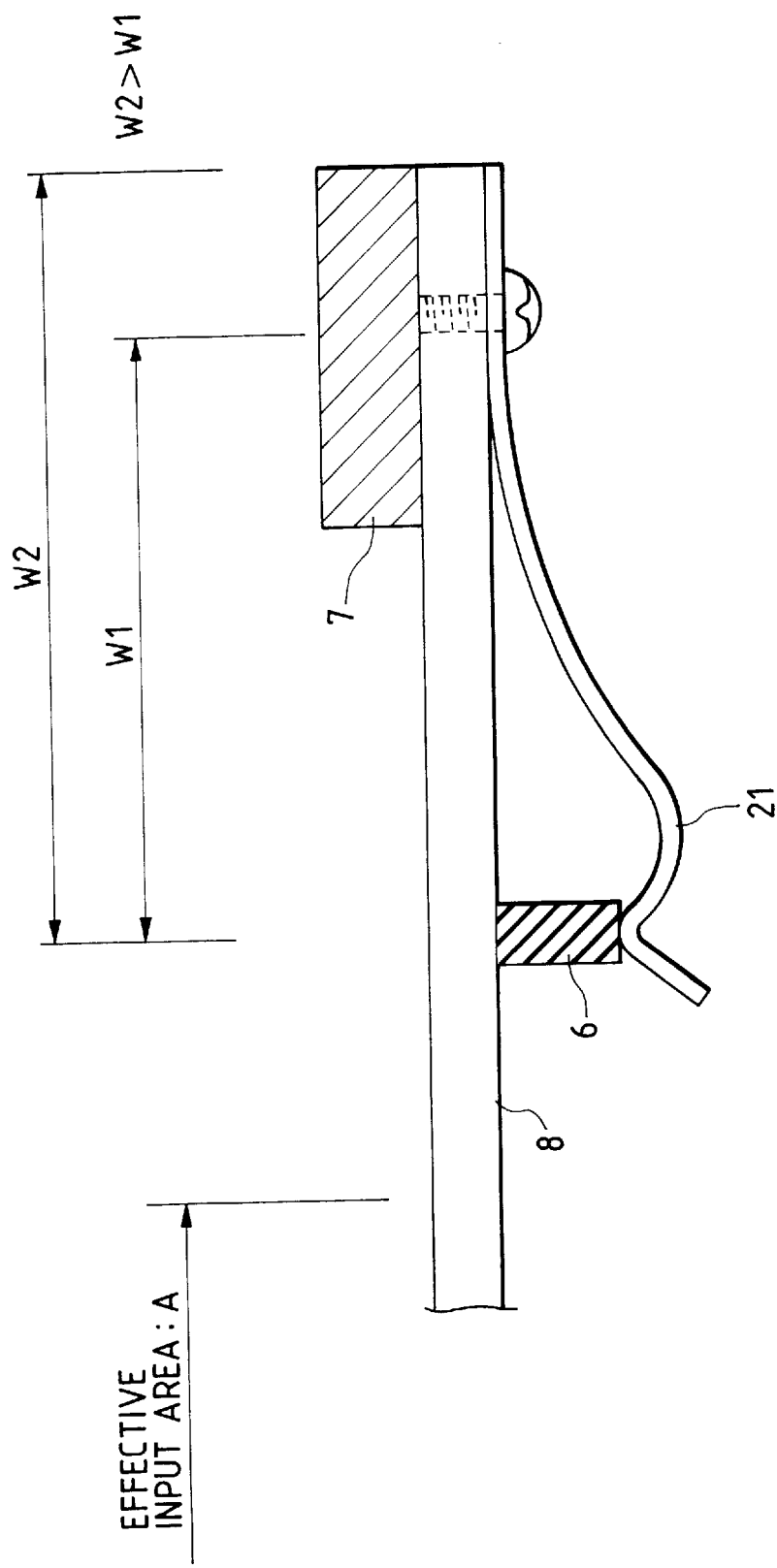

COORDINATES INPUT APPARATUS AND VIBRATION DETECTING APPARATUS

BACKGROUND OF THE INVENTION

1. Field of the Invention

The invention relates to a coordinate input apparatus and a vibration detecting apparatus. More particularly, the invention relates to a coordinate input apparatus which has a plurality of vibration sensors for detecting a vibration that is propagated in a vibration propagating plate and obtains input coordinates of a vibration applied to the vibration propagating plate and a vibration detecting apparatus which is used for, for example, the above coordinates input apparatus and has a vibration sensor that is used by fixing one electrode to a vibration propagating member.

2. Related Background Art

Hitherto, as a vibration sensor to detect a vibration, piezoelectric ceramics such as zirconic acid lead titanate (PZT) or the like is used. A shape of a device, a vibration mode of the device, and the like are set so as to efficiently detect a sound wave of a predetermined frequency which propagates in an object to be measured. Namely, to efficiently detect the vibration, the device shape is determined so as to make a mechanical resonance of the vibration sensor coincide with a frequency of the detection sound wave and a vibration mode of the vibration to be detected or the like is considered, thereby deciding a sensitivity of the device or an installing method of the device.

There is an apparatus of Japanese Patent Laid-Open Application No. 61-33525 as a prior art of a coordinate input apparatus for calculating coordinates of a vibration input point by measuring an arrival delay time of a sound wave from a vibration generating source by using such a kind of vibration sensor. The prior art discloses a method whereby the foregoing vibration sensor is adhered and fixed to a predetermined position of the vibration propagating plate and an electric conduction is derived from the vibration sensor by a lead wire.

Further, for example, in Japanese Patent Laid-Open Application No. 1-68823 and Japanese Patent Laid-Open Application No. 1-114927, there is also disclosed an apparatus such that it has a guide to position a vibration sensor and the vibration sensor is come into engagement with and positioned into, for instance, an engagement hole formed in the guide and the positioned vibration sensor is come into pressure contact with and fixed to a vibration propagating plate by a spring force or the like.

Such a kind of coordinates input apparatus uses the following fundamental principle such that each arrival delay time of a wave from the vibration generating source to each vibration sensor is respectively measured, distances from a vibration input point to the vibration sensors are respectively calculated by products of a sound velocity of the wave and those delay times, and the coordinates of the position of the vibration input point are geometrically calculated on the basis of the distance information and the arrangement of the vibration sensors. To accurately calculate the coordinates, therefore, it is necessary to accurately obtain the position of the vibration sensor or to accurately fix the vibration sensor to a desired position.

The above conventional apparatuses, however, have the following problems.

First, according to the conventional apparatus disclosed in Japanese Patent Laid-Open Application No. 61-33525, since the lead wire is attached to the electrode of the vibration sensor by, for example, means such as a soldering or the like in order to obtain the electric conduction with the vibration sensor, characteristics of the vibration sensors vary depending on an amount of solder or the position of the soldering and it is difficult to obtain a stable signal from each vibration sensor. Namely, although a plurality of vibration sensors are necessary to calculate the coordinates, the characteristics of each vibration sensor deteriorate due to the electrode leading means and it is difficult to obtain the same characteristics with respect to each vibration sensor.

Particularly, in case of using such a coordinate input apparatus for a pen input type computer such that the coordinates input apparatus and an output apparatus such as a display or the like are overlappingly arranged and a process (input of coordinates) can be performed like a feeling as if a paper and a pencil were used, when considering a portability or the like of the apparatus, a size of vibration sensor itself is limited and it is necessary to generally form a small device. In such a case, therefore, even if the soldering amount is small, an influence by the soldering cannot be ignored. Namely, some correcting means including an adjustment or the like is necessary. Not only it results in a cause of an increase in costs but also it results in a case of an obstacle for a mass production of the apparatus.

According to the conventional apparatuses of Japanese Patent Laid-Open Application No. 1-68823 and Japanese Patent Laid-Open Application No. 1-114927, since the electric contact is provided on the axis of the vibration detecting device by the spring force without using the means such as soldering or the like, the problems as mentioned above are improved. However, there are the following new problems.

As shown in Japanese Patent Laid-Open Application No. 61-33525, in case of adhering the vibration sensor to the vibration propagating plate, in a manner similar to the conventional technique, the vibration sensor can be adhered and fixed onto the vibration propagating plate at a high precision by using an image processing technique and an XY stage with an excellent positioning accuracy using a tool of a high precision, for example, a linear scale or the like. However, according to the conventional apparatuses of Japanese Patent Laid-Open Application No. 1-68823 and Japanese Patent Laid-Open Application No. 1-114927 mentioned above, since the vibration sensor is positioned by the engagement hole formed in the guide, although it is necessary to accurately set the position of the guide, it is not easy and not a few errors are included.

According to such kinds of coordinates input apparatuses, the distance between the vibration input point and each vibration sensor is calculated by the arrival delay time of the wave and the sound velocity and the position of the vibration input point is derived from the calculation result and the geometric arrangement information of the vibration sensors. Therefore, if an error is included in the arrangement of the vibration sensors, a coordinatecalculating precision deteriorate in association with the error. When explaining by using specific numerals, there is a case where the relative distance of the vibration detecting device is set to, for example, about 500 mm at most in dependence on an application. It is technically extremely difficult to realize a mass production of the apparatus while setting a tolerance for the distance 500 mm to ±0.05 mm (tolerance is 0.01%) by a mechanical machining precision. Even if a machining technique which can realize such a mass production exists, not only the costs are very high but also it becomes a large obstacle for a mass production of the apparatus. Namely, according to such conventional apparatuses, the positioning precision of the vibration detecting device is influenced by the machining precision when the mass production of the apparatus is performed. For example, now assuming that the tolerance of 0.1% (namely, machining precision of ±0.5 mm) for the distance 500 mm exists, the coordinates calculating precision of the coordinates input apparatus will never be better than +0.5 mm due to only such a tolerance. In other words, it is difficult to cheaply mass-produce the coordinates input apparatus for calculating the coordinates at a high precision.

As a method of solving such a problem, a method whereby after the apparatus was assembled, the positions of the vibration sensors are measured and the accurate geometrical information is obtained with respect to the arrangement of the vibration sensors, thereby improving the coordinates calculating precision is considered. According to such a method, however, it is admitted that the vibration sensors are arranged at random within a range of the machining precision. The calculation of the coordinates by the above information makes the calculation complicated and increases the calculating time. Consequently, this results in a decrease in sampling speed for calculation of the coordinates. Namely, although the coordinates can inherently be sampled at a rate of 200 times/sec, by assembling the correcting means, the calculating time to calculate the coordinates increases and the sampling speed deteriorates to, for instance, about 50 times/sec. Thus, a problem such that a holograph of the operator cannot be reconstructed at a high fidelity occurs. Particularly, when a writing speed of the operator is fast, since such a phenomenon becomes remarkable, it becomes a cause of erroneous recognition in a system such that a character is recognized by coordinates information. Such a problem is fatal. The costs obviously cannot help rising due to an increase in a checking step.

The invention is made in consideration of the above problems and it is an object of the invention to provide a coordinate input apparatus which can stably input coordinates at a high precision and to also provide a coordinate input apparatus which can be easily mass produced.

Another object of the invention is to provide a vibration detecting apparatus which can stably detect a vibration at a high precision.

SUMMARY OF THE INVENTION

According to an embodiment of the invention, there is provided a coordinate input apparatus which has a plurality of vibration sensors for detecting a vibration that is propagated in a vibration propagating plate and obtains input coordinates of the vibration applied to the vibration propagating plate, comprising: conductive electrode leading means having a contact portion which is electrically come into contact with an electrode of the vibration sensor; positioning means for making the contact portion come into contact with a predetermined position of the electrode by setting a predetermined portion of the vibration sensor to a reference; and conductive pressing means for pressing the electrode leading means to the electrode, wherein a signal of the vibration sensor is taken out from the electrode through the pressing means.

BRIEF DESCRIPTION OF THE DRAWINGS

FIG. 10 is a diagram showing an example in which a plate spring is directly fixed to a vibration propagating plate and the plate spring and the vibration propagating plate are constructed by using the same material.

DETAILED DESCRIPTION OF THE PREFERRED EMBODIMENTS

Embodiments of the present invention will now be described hereinbelow as an example with reference to the drawings.

<First embodiment of the invention>

Figure 1:
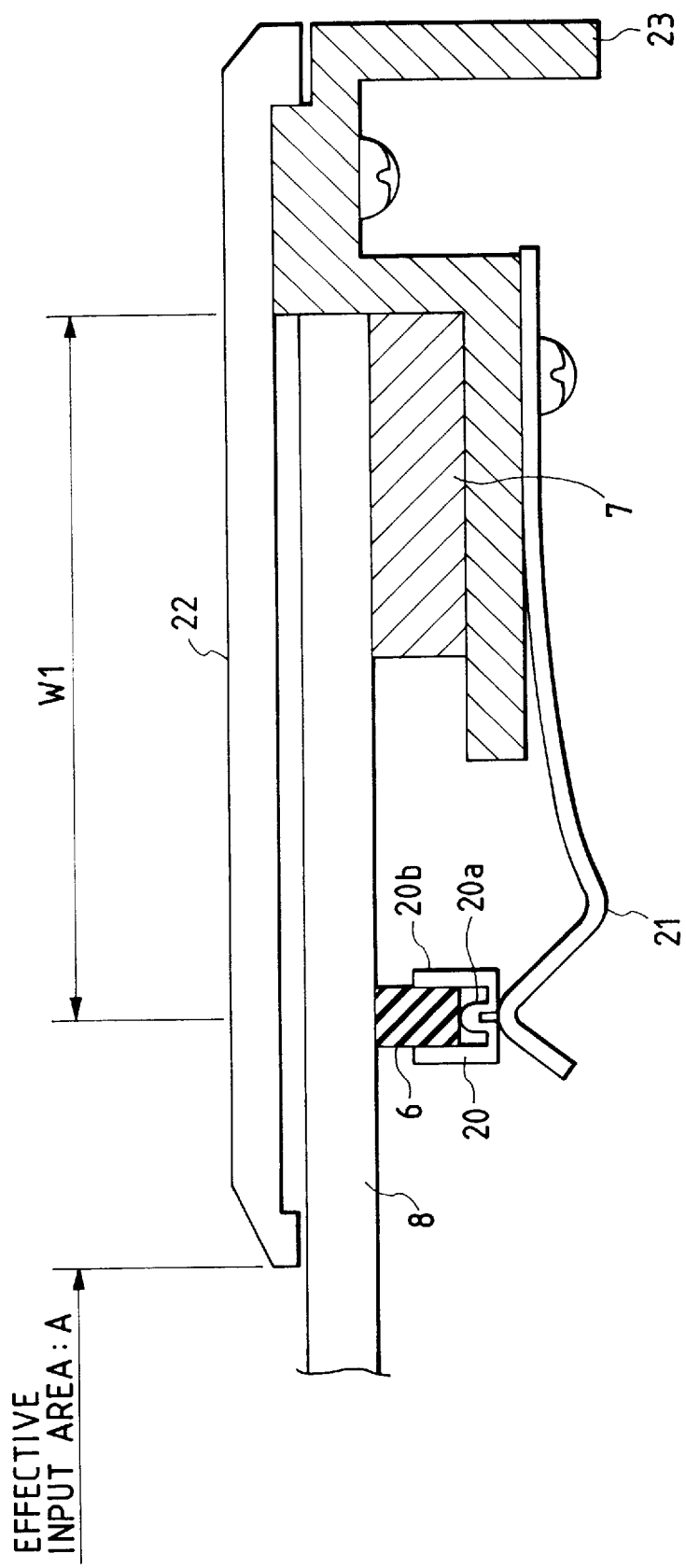
FIG. 1 is a diagram showing a cross sectional structure around a vibration sensor of a coordinate input apparatus according to the first embodiment.
Figure 2:
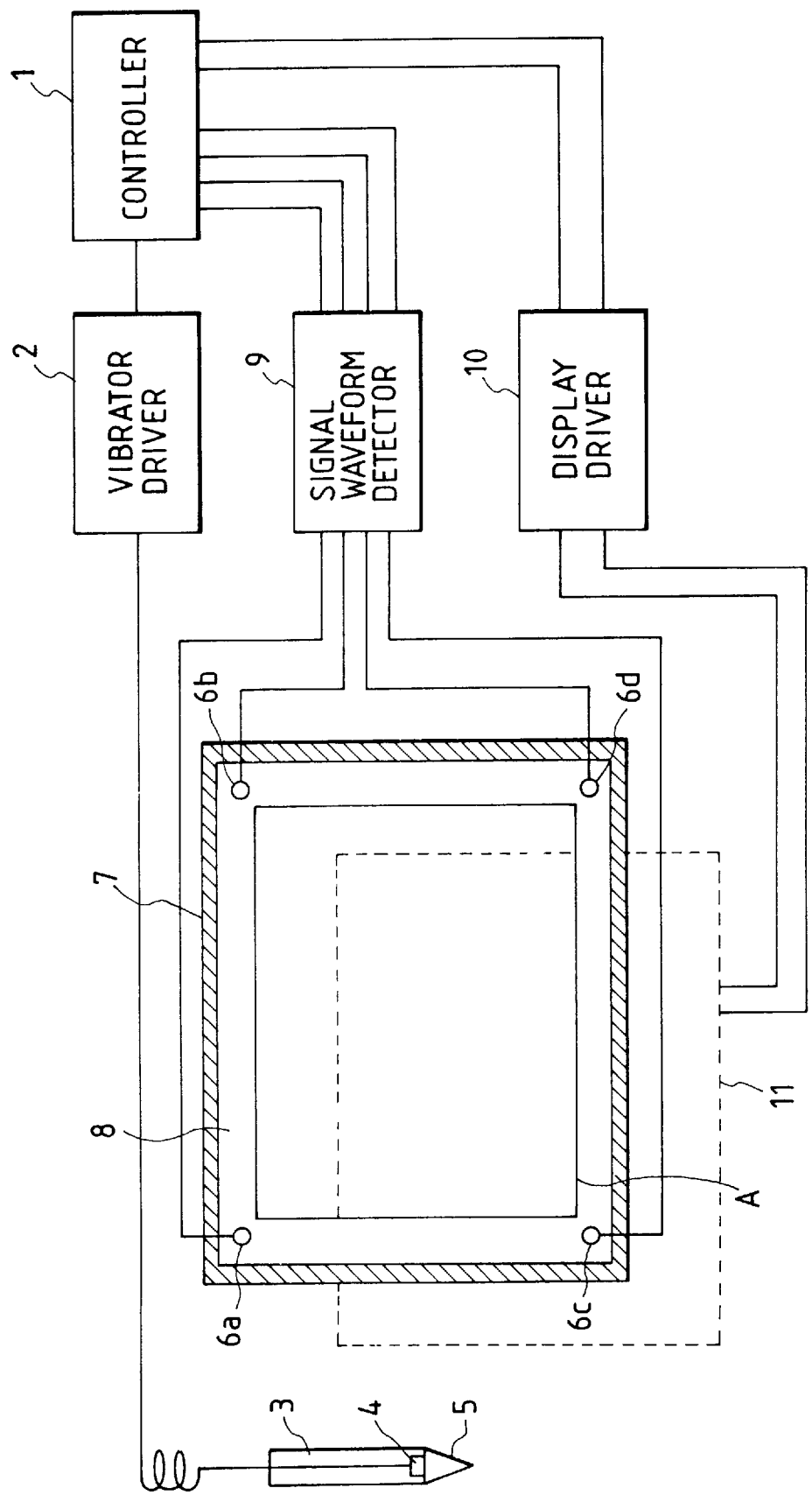
FIG. 2 is a diagram showing a constructional example of the coordinates input apparatus.

FIG. 1 is a diagram showing a cross sectional structure around a vibration sensor of a coordinate input apparatus according to the embodiment. FIG. 2 is a diagram showing a whole construction of the coordinates input apparatus. In FIG. 2, a controller 1 controls the whole apparatus and calculates coordinates inputted by a vibrator pen 3. A vibrator driver 2 generates a drive signal to drive a vibrator 4 built in the vibrator pen 3. The vibrator pen 3 vibrates the vibrator 4 on the basis of the drive signal and inputs a vibration to a vibration propagating plate 8 through a pen tip 5. For example, the vibration propagating plate 8 is made of a transparent material such as acryl, glass, or the like. The coordinates input by the vibrator pen 3 is executed by making the pen tip 5 of the vibrator pen 3 come into contact with an effective area (area A) for the coordinates input on the vibration propagating plate 8.

A damping material 7 to prevent (attenuate a reflected wave) that the vibration inputted by the vibrator pen 3 is reflected by the edge surface of the vibration propagating plate 8 and is returned to the center portion is provided around the outer periphery of the vibration propagating plate 8. Vibration sensors 6a to 6d each including a piezoelectric device (for example, PZT or the like) or the like for converting a mechanical vibration into an electric signal are fixed to a peripheral portion of the vibration propagating plate 8. Signals from the vibration sensors 6 (6a to 6d) are amplified by an amplifier (which will be described hereinlater). After that, the signals are sent to a signal waveform detector 9 and are subjected to predetermined signal processes. Resultant digital detection signals (Tp signal, Tg signal) are supplied to the controller 1. The controller 1 calculates input coordinates on the basis of the detection signals.

A display 11 such as a liquid crystal display or the like which can display on a dot unit basis is arranged on the back surface of the vibration propagating plate 8. The display 11 is driven by a display driver 10. The display driver 10 forms a video signal to drive the display 11 on the basis of image information which is supplied from the controller 1. For example, the display 11 displays a locus which is formed by tracing onto the vibration propagating plate 8 by the vibrator pen 3. Since the vibration propagating plate 8 is made of a transparent material as mentioned above, the operator can see the locus through the vibration propagating plate 8.

As mentioned above, the vibrator 4 built in the vibrator pen 3 is driven by the vibrator driver 2. A drive signal of the vibrator 4 is supplied as a pulse signal at a low level from the controller 1 to the vibrator driver 2. The pulse signal is amplified at a predetermined gain by the vibrator driver 2 and, after that, it is supplied to the vibrator 4. The electric drive signal is converted into a mechanical ultrasonic wave by the vibrator 4 and is propagated to the vibration propagating plate 8 through the pen tip 5.

A vibrating frequency of the vibrator 4 is set to a value such as to enable a plate wave to be generated in the vibration propagating plate 8 made of a transparent material such as acryl, glass, or the like. An efficient vibration conversion can be performed by setting the vibrating frequency of the vibrator 4 to a resonance frequency of a vibration propagating member including the pen tip 5. An elastic wave which is transferred to the vibration propagating plate 8 as mentioned above is a plate wave and has an advantage such that it is difficult to be influenced by a scratch of the surface of the vibration propagating plate, an obstacle, or the like as compared with a surface wave or the like.

<Constructional example of a vibration sensor portion>

A detailed constructional example of the vibration sensor of the coordinates input apparatus will now be described. In FIG. 1, a vibration sensor 6 is fixed to the vibration propagating plate 8 by means such as an adhesion or the like. A positioning in the surface direction of the vibration propagating plate 8 is executed by using: ultraaccurate moving means (for example, an XY stage or the like) to which adhering means is attached; a system using an image process in order to confirm that the vibration propagating plate 8 has been positioned to a desired position or to position the XY stage to a desired position while feeding back position information; and the like. It will be obviously understood that any positioning means other than the above devices can be also used and, for example, a tool capable of accurately positioning can be also manufactured and used.

In the embodiment, the vibration sensors 6 which are adhered as mentioned above exist at four positions and are positioned at desired positions at a high precision, respectively. Distance information among the vibration sensors are used in a coordinate calculating step, which will be explained below. Further, in case of the embodiment, a cylindrical sensor is used as a vibration sensor 6. The vibration sensor 6 is a piezoelectric device which is polarized in the axial direction and electrodes are formed at both edge surfaces of the device.

In case of forming the vibration propagating plate 8 by a conductive material such as stainless steel, aluminum, or the like, by adhering the vibration sensor 6 to the plate 8, an electric conduction between the vibration propagating plate 8 and one electrode of the vibration sensor 6 is derived. The vibration sensor 6 can be connected to the signal waveform detector 9 by electric connecting means (not shown). As electric connecting means, for example, it is also possible to use any one of means for caulking a lead wire of the signal waveform detector 9 to the vibration propagating plate 8, means for fixing the lead wire to the plate 8 with a screw or the like, and means for making a plate spring made of metal come into pressure contact with the vibration propagating plate 8 by soldering or the like and for leading out a lead wire.

When the vibration propagating plate 8 is made of a non-conductive material such as glass, acrylic resin, or the like, by providing a conductive layer (for example, printing, evaporation deposition, or the like by conductive ink such as Dotite or the like) near a position where the vibration sensor 6 is adhered, an electric connection can be obtained by a method similar to that mentioned above.

A method of leading out the other electrode will be further described. As also mentioned in the Related Background Art, a work for directly attaching the lead wire from the electrode of the vibration sensor 6 by the soldering means or the like becomes a cause which largely fluctuates vibrating characteristics of the vibration sensor 6.

Figure 8A:
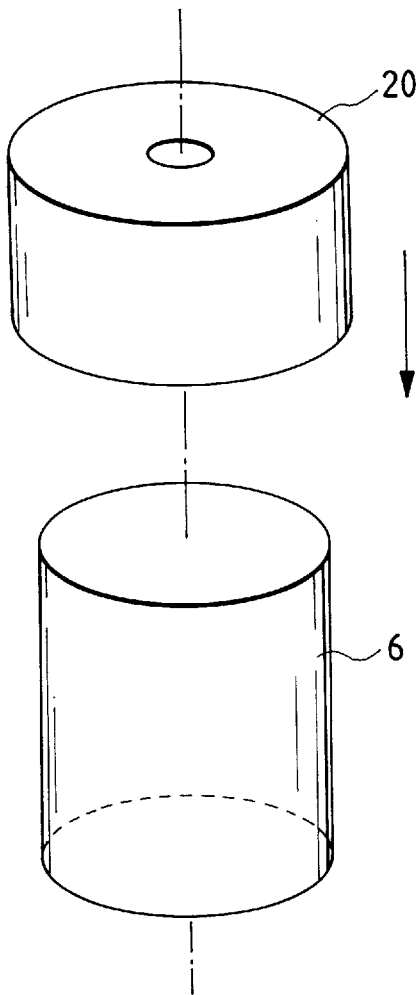
FIGS. 8A and 8B are diagrams showing constructional examples of vibration sensors and electrode leading members.

In the embodiment, therefore, an electric conduction is derived by using an electrode leading member 20 and a metal plate spring 21 (its cross sectional view is shown in FIG. 1). The electrode leading member 20 has a cylindrical shape in which one edge surface is closed. FIG. 8A shows a perspective view thereof. The electrode leading member 20 is made of, for example, a conductive metal such as a copper alloy or the like and is formed by, for example, drawing. On the inside of the bottom surface (closed one edge surface) of the electrode leading member 20, a projecting portion 20a is formed at the center axial position. A cylindrical portion 20b of the electrode leading member 20 has a shape adapted to be come into engagement with the vibration sensor 6. By inserting the cylindrical portion 20b to the cylindrical vibration sensor 6a, the projecting portion 20a coincides with the center axis of the vibration sensor 6. When both of them are come in contact with each other, an electric conduction is derived between the electrode leading member 20 and vibration sensor 6.

According to the above description, the plate spring 21 is made conductive and the lead wire is led out from the plate spring 21 by the soldering means or the like and is connected to the signal waveform detector 9. However, another structure can be also obviously used. For example, the lead wire can be also directly connected to the electrode leading member 20 by soldering or the like and connected to the signal waveform detector 9. In this case, it is sufficient that the plate spring 21 merely allows the front edge portion 20a to be come into pressure contact with the vibration sensor 6 and doesn't need to have a conductivity. Therefore, the plate spring 21 can be also formed with, for instance, a resin or the like.

One end of the plate spring 21 is positioned while setting a resin frame 23 (or the vibration propagating plate 8) of the coordinates input apparatus to a reference and is fixed with a screw. The fixed plate spring 21 allows the electrode leading member 20 to be come into pressure contact with the vibration sensor 6 by a restoring force. A casing 22 is retained to the frame 23. In the vibration propagating plate 8, a region which is not covered by the casing 22 is an effective area A where coordinates can be inputted.

Advantages of the above structure will now be described. To improve the precision of the coordinates input apparatus, it is first necessary to correctly arrange the vibration sensors 6. In FIG. 2, it is now assumed that a size of effective area A is set to about the size of an A3 type paper and a distance between the vibration sensors 6a and 6b is set to, for example, 450 mm and a distance between the vibration sensors 6a and 6c is set to 330 mm. In this instance, it is necessary to arrange the vibration sensors 6 at a high precision and it is assumed that they were positioned in accordance with the foregoing method.

At this time, it will be easily understood by comparing the structure (structure having the electrode leading member 20)

of the vibration sensor 6a according to the above description and the conventional structure (structure without the electrode leading member 20). As for the electric conduction between the vibration sensor 6 and electrode leading member 20, it is perferably in that the edge portion 20a is pressed in contact with the center axis of the vibration sensor 6a so as not to exert an influence on the vibrating characteristics of the vibration sensor 6.

Therefore, when the electrode leading member 20 is not provided (conventional apparatus), it is also necessary to position the plate spring 21 at a high precision (the plate spring 21 needs to be come into contact with the center axis of the vibration sensor 6a). For example, there is the following means for fixing one end of the plate spring 21 to the frame 23. Namely, an engagement hole is formed in the plate spring 21, a boss is formed upward on the frame 23, both of them are arranged and positioned so as to be come into engagement with each other, and after that, they are fixed by means such as a screw or the like. The boss to be used for positioning needs to be arranged at a very high precision in order to make the plate spring 21 come into contact at the center axis (center portion of the electrode) of the vibration sensor 6. Therefore, it is necessary to manufacture the bosses at a tool precision of, for example, 450±0.05 mm for the distance of 450 mm between the vibration sensors 6 (the boss is necessary for each of the vibration sensors 6a and 6b; in case of using the parts of the same construction, the distance between the bosses is also equal to 450 mm). Such a tool precision causes a problem that it is very difficult to manufacture those bosses. It is extremely difficult to manufacture them by the ordinary manufacturing method of simultaneously molding the bosses when the frame 23 is formed by molding. Therefore, it is effective to use a working method of accurately positioning the bosses by a method whereby the frame 23 is formed by molding by the ordinary method and the position is measured every frame and, for instance, a pin or the like is implanted at a desired position. According to such a working method (method whereby after the frame was formed by molding, a secondary work which requires an accurate working precision is executed), a working time is very long and not only a mass productivity is obstructed but also costs are very high.

Further, even if the foregoing problems (problem such that it is difficult to manufacture at a high precision) are solved and the apparatus can be mass produced at a high precision, a problem in association with a fluctuation in environment, particularly, a fluctuation in temperature still remains. For example, in the environment upon manufacturing, even if the contact position between the plate spring 21 and vibration sensor 6 coincides with the axial center of the vibration sensor 6, the contact position changes due to, for example, a fluctuation in temperature. For instance, since materials of the vibration propagating plate 8 (e.g., aluminum plate), damping material 7 (e.g., butyl rubber), and frame 23 (e.g., ABS material) are different, the contact position changes in association with a fluctuation in temperature due to differences among coefficients of linear expansion. Namely, vibrating characteristics of the vibration sensor 6 largely change due to a fluctuation in environment. Thus, the shape of a signal waveform detected by the vibration sensor 6 changes (is distorted) and the coordinate calculating precision deteriorates.

As a method of solving those problems, it is also considered to construct the apparatus as shown in FIG. 10. Namely, it is also possible to use a method whereby the plate spring 21 is directly fixed to the vibration propagating plate 8 and the plate spring 21 and vibration propagating plate 8 are formed by the same material (or materials having the same coefficient of linear expansion), thereby preventing the change in contact position due to the heat. Even in this method, positioning means for attaching the plate spring 21 also has the difficulty when manufacturing at a high precision as mentioned above. Further, the method has a problem which is peculiar to the coordinates input apparatus using the ultrasonic wave.

For example, when attention is paid to the means (e.g., screw) for fixing the plate spring 21 to the vibration propagating plate 8, for instance, a screw hole is formed in the fixing portion and the screw is pierced. There is consequently a problem such that an acoustic discontinuity occurs in the fixing portion and a sound wave is reflected there. As also already mentioned above, since the reflected wave becomes a cause of an erroneous detection, the damping material 7 is arranged to reduce the reflected wave and, further, a distance W1 (refer to FIG. 1) from the vibration sensor 6 to the edge surface of the vibration propagating plate 8 is assured. However, according to the structure shown in FIG. 10, since the screw hole exists in the middle of the structure, it is necessary to assure the distance W1 as a distance from the vibration sensor 6 to the position of the screw hole and to assure a distance W2 as a distance from the vibration sensor 6 to the edge surface of the vibration propagating plate 8. A surplus space is required as compared with the structure shown in FIG. 1.

This means that in case of constructing so as to equalize the effective areas A, the vibration propagating plate 8 in the structure shown in FIG. 10 is larger than that of the structure shown in FIG. 1, namely, the whole apparatus is larger. Consequently, such a large structure becomes very disadvantageous specifications when constructing the system. Although a situation such that the above drawback doesn't cause a problem in dependence on the specifications of a product can be also obviously presumed, even in such a situation, according to the structure shown in FIG. 10, with respect to the plate spring 21 as well, it is necessary to position the plate spring 21 to a desired position by using the XY stage, image processing system, and the like as described above and to fix the plate spring 21. Namely, the plate spring 21 is not positioned by mechanical means (for instance, screw hole) but after it was positioned by using the system as mentioned above, it is necessary to mechanically (for instance, with a screw, an adhesion, or the like) fix the plate spring 21 to the vibration propagating plate 8. However, according to such a method, in addition to that a manufacturing time and costs extremely increase, a problem is also caused in a working performance upon assembly or the like, and it becomes an obstacle for mass production.

As mentioned above, those problems can be solved by arranging the electrode leading member 20 between the vibration sensor 6 and plate spring 21. Namely, by providing the electrode leading member 20, it is sufficient to roughly position the plate spring 21 (namely, the electric contact position between them is conformed by merely allowing the electrode leading member 20 to be come into engagement with the vibration sensor 6). Since the electric conduction is executed on the center axis of the vibration sensor 6, a stable signal can be taken out.

Further, since the electrode leading member 20 has a construction such that it is depressed to the vibration sensor 6 by the plate spring 21, even if the contact position between the electrode leading member 20 and plate spring 21 is freely moved, no problem will occur. Therefore, even if the foregoing problem of the heat exists, its influence is merely exerted on the movement of the contact position between the electrode leading member 20 and plate spring 21. The contact position between the vibration sensor 6 and electrode leading member 20 is maintained on the axis of the vibration sensor 6 and the signal can be stably detected.

According to the embodiment described above, the cheap coordinates input apparatus having a stable performance can be mass produced. However, the vibration sensor 6 and electrode leading member 20 are not limited to the foregoing structure. That is, the above structure is merely illustrated and explained as an example with respect to the cylindrical vibration sensor 6 and the electrode leading member 20 which is conformed and is come into engagement therewith. It is sufficient that the shapes of the vibration sensor 6 and electrode leading member 20 have a relation in which the vibration sensor 6 and electrode leading member 20 are mutually conformed in a manner such that the electric contact point (corresponding to the edge portion 20a) included in the electrode leading member 20 is come into contact with a predetermined position (for example, center axis) of the electrode of the vibration sensor 6.

Figure 8B:
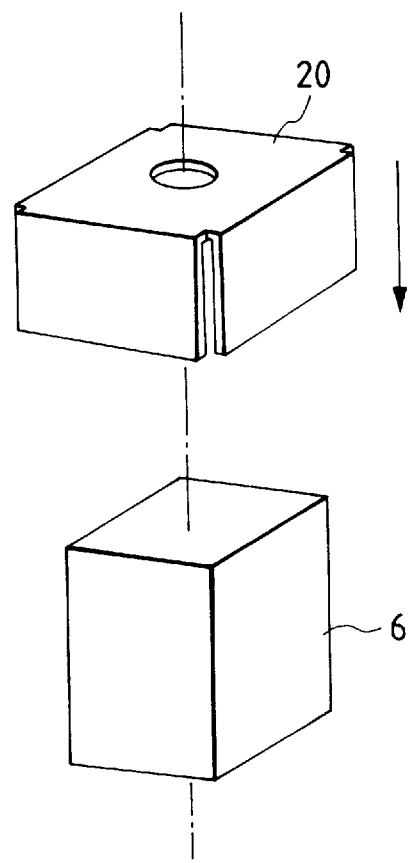

Specifically speaking, a prismatic vibration sensor as shown in FIG. 8B can be also used. A method of forming the electrode leading member 20 is not limited to the drawing but another forming method (shape) using a bending work can be also obviously used. Further, with respect to a product such that there is no problem on a size of apparatus, by adding the electrode leading member 20 to the structure shown in FIG. 10, the problem about the difficulty in positioning of the plate spring 21 can be solved.

<Explanation of the controller>

The controller 1 will now be described. The controller 1 generates a signal to drive the vibrator 4 of the vibrator pen 3 through the vibrator driver 2 at every predetermined period (for example, every 5 msec) and starts a time counting operation by a timer (for instance, constructed by a counter) built in the controller. A vibration is generated by the vibrator pen 3. The pen tip 5 is come into contact with the vibration propagating plate 8, so that the vibration is applied to the vibration propagating plate 8. The vibration is delayed in accordance with the distances from the input position of the vibration to the vibration sensors 6a to 6d and reaches the vibration sensors 6a to 6d.

The signal waveform detector 9 detects the signals sent from the vibration sensors 6a to 6d and forms timing signals (Tg signal, Tp signal) showing vibration arrival timings to the vibration sensors 6a to 6d by signal detecting processes, which will be explained hereinlater, and supplies to the controller 1. On the basis of the timing signals regarding the sensors 6a to 6d, the controller 1 obtains the vibration arrival times from the input position of the vibration to the vibration sensors 6a to 6d, thereby calculating the input position (coordinates) of the vibration by the vibrator pen 3 from the vibration arrival times.

On the basis of the information of the calculated input position, the controller 1 drives the display driver 10 and can control, for example, the display by the display 11 or can output the coordinates to an external equipment by serial and/or parallel communicating means (not shown).

Figure 3:
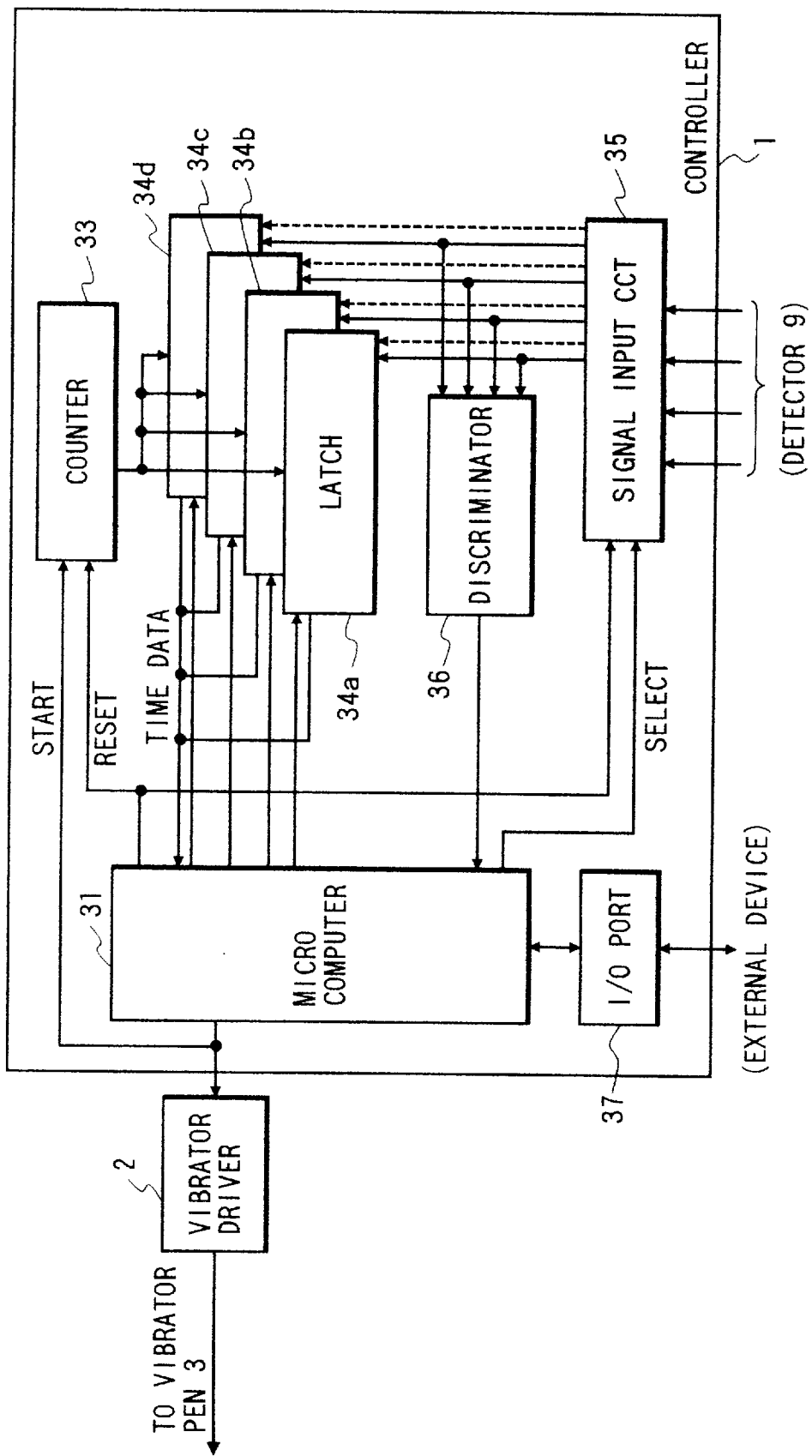
FIG. 3 is a diagram showing a constructional example of a controller.

FIG. 3 is a diagram showing a constructional example of the controller 1 and each component element and operation of the controller will now be schematically described hereinbelow. In the diagram, a microcomputer 31 controls the whole controller 1 (coordinates input apparatus). In addition to a CPU, the microcomputer 31 includes: an ROM in which an operating procedure which is supplied to the CPU has been stored; an RAM which is used as a work memory or the like; a non-volatile memory to store various constants or the like; and the like. A program instructing sequence such as step of controlling the measurement of the vibration propagation times, step of calculating the vibration propagation distances from the vibration propagation times, step of correcting the calculated vibration propagation distances, step of calculating input coordinates of the vibration from the vibration propagation distances, step of outputting the calculated coordinates, and the like is included. Those processing steps will be explained hereinlater.

A counter 33 is a timer (counter) for measuring a time on the basis of a reference clock (not shown). When a start signal to start the driving of the vibrator 4 in the vibrator pen 3 is inputted to the vibrator driver 2, the counter 33 starts the counting operation at such an input timing of the start signal. Thus, the start of the time counting operation and the vibration detection by each of the vibration sensors 6a to 6d are synchronized. On the basis of the vibration arrival timing signals (Tp, Tg), it is recognized that the inputted vibration has been delayed and reached the vibration sensors 6a to 6d. The vibration propagation times can be obtained.

The vibration arrival timing signals (Tp, Tg) regarding each of the vibration sensors 6a to 6d which are generated from the signal waveform detector 9 are inputted to latches 34a to 34d through a detection signal input circuit 35. The latches 34a to 34d correspond to the vibration sensors 6a to 6d, respectively. When a vibration arrival timing signal regarding the corresponding vibration sensor is received, the latch latches a count value of the counter 33 at that time. When a discriminator 36 determines that all of the detection signals have been received, the discriminator outputs a signal indicative of such a fact to the microcomputer 31. When the microcomputer 31 receives the signal from the discriminator 36, the microcomputer reads the vibration arrival times to the vibration sensors 6a to 6d from the latches 34a to 34d and executes predetermined calculations on the basis of the vibration arrival times, thereby calculating the coordinates position of the vibrator pen 3 on the vibration propagating plate 8.

By outputting the calculated coordinates position information to the display driver 10 through an I/O port 37, for example, dots or the like can be displayed at the corresponding position of the display 11. By outputting the coordinates position information to an interface circuit through the I/O port 37, the coordinates values can be also outputted to the external equipment.

<Detection example of the vibration arrival time>

Figure 4:
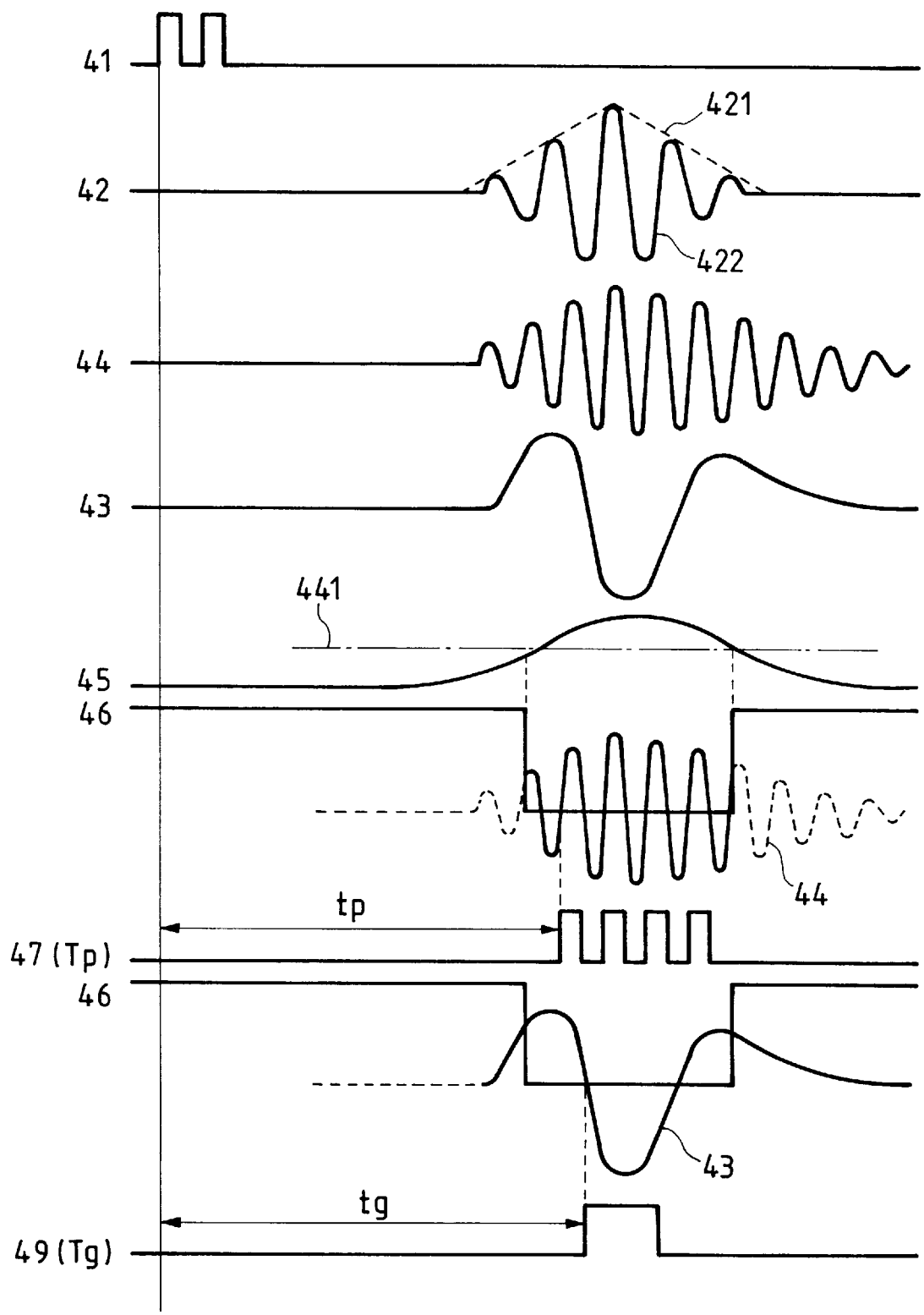
FIG. 4 is a diagram showing signal waveforms which are inputted to a signal waveform detector and signals regarding a measuring process of vibration propagation times based on those signal waveforms.

FIG. 4 is a diagram showing signal waveforms which are inputted to the signal waveform detector 9 and signals regarding measuring processes of the vibration propagation times based on the signal waveforms. Although the case of the vibration sensor 6a will be described hereinbelow, the same shall also apply to the other vibration sensors 6b, 6c, and 6d, respectively.

As already been described, the measurement of the vibration propagation time from the input position of the vibration to the vibration sensor 6a is started simultaneously with the output of the start signal (drive signal) to the vibrator driver 2. In this instance, a drive signal 41 is supplied from the vibrator driver 2 to the vibrator 4. By the drive signal 41, the ultrasonic vibration propagated from the vibrator pen 3 to the vibration propagating plate 8 progresses for a time corresponding to the distance up to the vibration sensor 6a. After that, it is detected by the vibration sensor 6a. A signal 42 shows a signal waveform detected by the vibration sensor 6a.

As mentioned above, since the plate wave is used in the embodiment, a velocity (group velocity Vg) at which an envelope 421 of the detection waveform (signal 42) propagates and a velocity (phase velocity Vp) at which a phase 422 propagates are different. Therefore, for the propagation distance in the vibration propagating plate 8, the relation between the envelope 421 of the detection waveform and the phase 422 changes in accordance with the propagation distance during the propagation of the vibration. In the embodiment, the distance between the vibrator pen 3 and vibration sensor 6a is detected from a group delay time Tg based on the group velocity Vg and a phase delay time Tp based on the phase velocity Vp.

Figure 5:
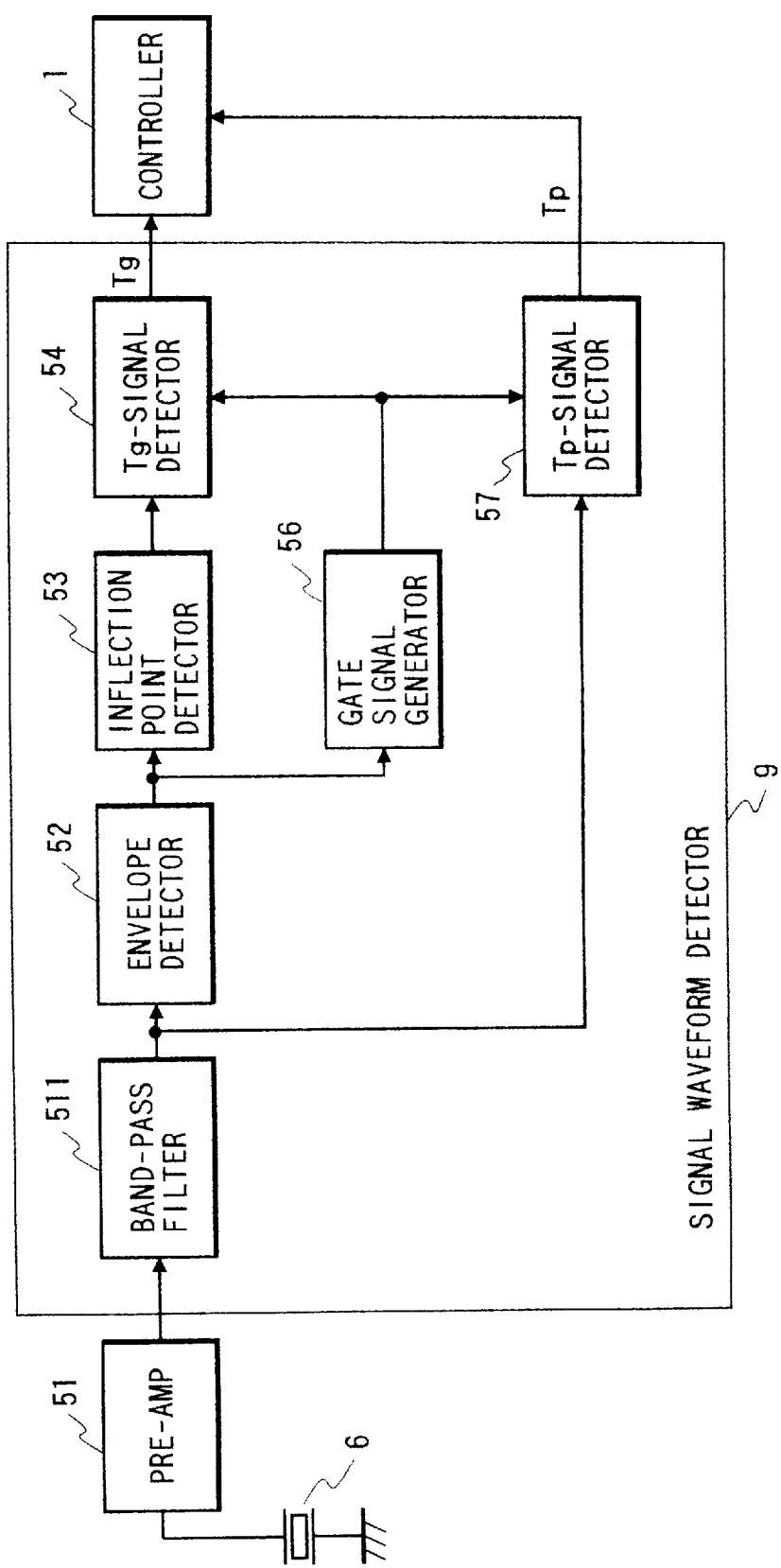
FIG. 5 is a diagram showing a constructional example of a signal detector.

FIG. 5 is a diagram showing a constructional example of the signal waveform detector 9. Means for detecting a group delay time tg and a phase delay time tp will now be described hereinbelow with reference to FIGS. 4 and 5. The output signal 42 of the vibration sensor 6a is amplified at a predetermined amplification ratio by a pre-amplifier 51. After that, the signal is supplied to a band-pass filter 511, by which surplus frequency components in the detection signal are removed by a band-pass filter 511, thereby forming a signal 44. When attention is paid to an envelope of the signal 44, a sound velocity at which the waveform propagates is a group velocity Vg. When a point (for example, a peak of the envelope or an inflection point of the envelope) on a certain specific waveform is detected, the delay time tg regarding the group velocity Vg is derived. Therefore, the signal which was amplified by the pre-amplifier 51 and passed through the band-pass filter 511 is supplied to an envelope detector 52 comprising, for example, an absolute value circuit, a low pass filter, or the like, by which an envelope signal 45 of the detection signal is extracted. Further, a gate signal generator 56 comprising a multivibrator or the like generates a gate signal 46 of a portion exceeding a threshold level 441 which has been preset for the envelope signal 45.

To detect the group delay time tg regarding the group velocity Vg, as mentioned above, it is sufficient to detect the peak, inflection point, or the like of the envelope. In the embodiment, however, the first inflection point (zero-cross point at the time of trailing of a signal 43, which will be explained hereinlater) of the envelope is detected. Therefore, the envelope signal 45 outputted by the envelope detector 52 is inputted to an envelope inflection point detector 53, so that the second-order differential waveform signal 43 of the envelope signal 45 is derived. In a Tg-signal detector 54 comprising a multivibrator or the like, the differential waveform signal 43 is compared (for example, by a comparator) with the gate signal 46. On the basis of a comparison result, a Tg signal 49 as a delay time detection signal (timing signal) of the envelope is formed and supplied to the controller 1.

The phase delay time tp regarding the phase velocity Vp will now be described. A Tp-signal detector 57 is a circuit to detect the phase delay time tp and is constructed by a zero-cross comparator, a multivibrator, or the like. The Tp-signal detector 57 detects a zero-cross point of the first leading edge of the phase signal 44 while the gate signal 46 is open and supplies the zero-cross point as a Tp signal 47 to obtain the phase delay time tp to the controller 1.

Although the above description relates to the vibration sensor 6a, it will be obviously understood that the same circuit can be also provided for each of the other vibration sensors 6b to 6d or the vibration sensors 6a to 6d are time-divisionally selected by using an analog switch or the like, thereby sharing the circuit.

<Calculation example of the distance between the vibrator pen and the vibration sensor>

Figure 6:
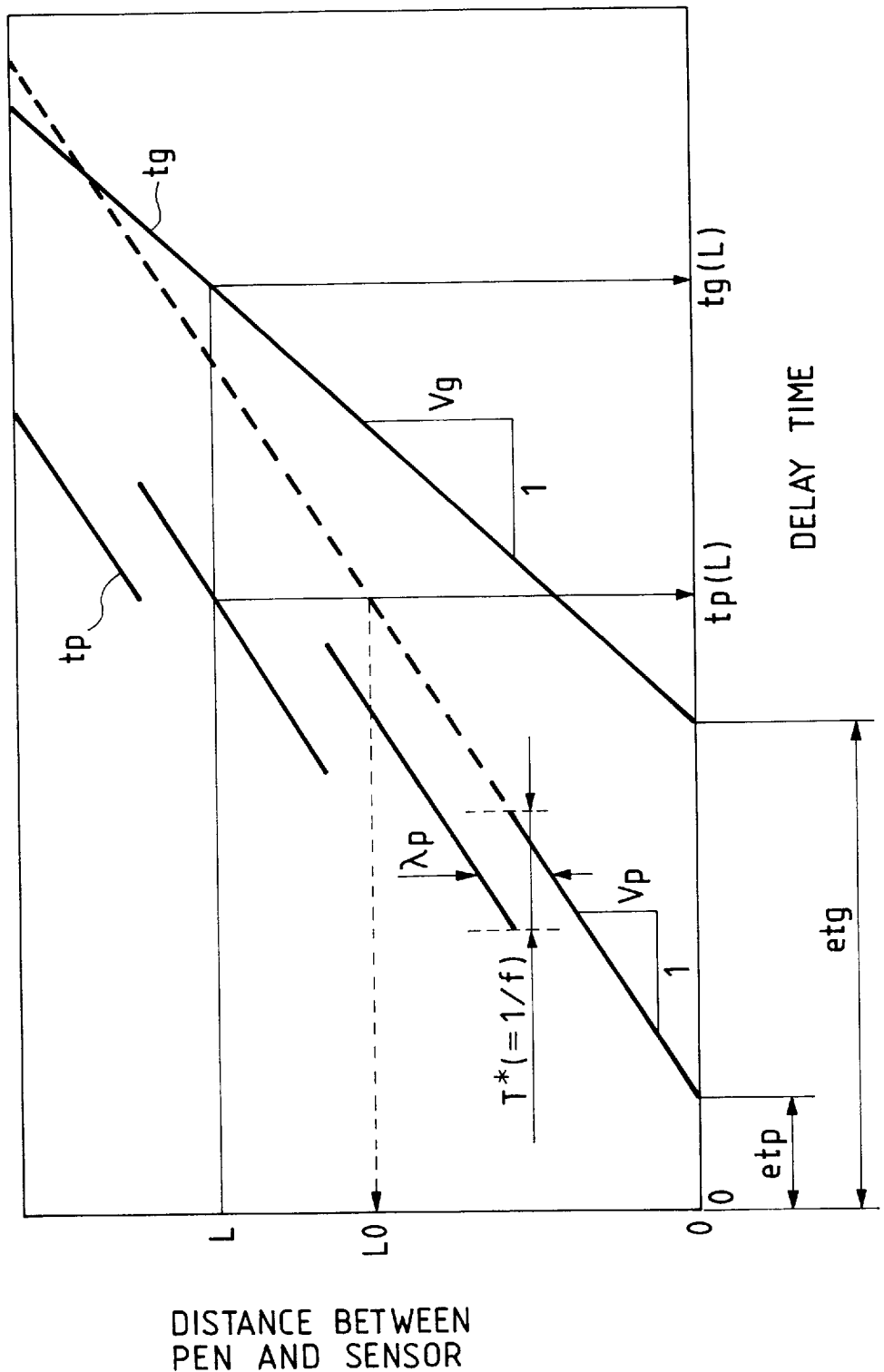
FIG. 6 is a diagram schematically showing relations among a group delay time tg, a phase delay time tp, and a distance L between a pen and a sensor, respectively.

A method of calculating the distance (hereinafter, also referred to as a distance between the pen and the sensor) from the vibrator pen 3 to each of the vibration sensors 6a to 6d from the group delay time tg and phase delay time tp obtained as mentioned above will now be described. FIG. 6 is a diagram schematically showing relations among the group delay time tg and phase delay time tp which are obtained by the embodiment and the distance L between the pen and the sensor, respectively. In the embodiment, since the plate wave is used as a detection wave, the group delay time tg doesn't have a good linearity. Therefore, in the case where the distance L between the vibrator pen 3 and each of the vibration sensors 6 (6a to 6d) is obtained as a product of the group delay time tg and group velocity Vp as shown in the following equation (1), the distance L cannot be accurately obtained.

$$L = Vg \cdot tg \qquad (1)$$

Therefore, to more accurately obtain the distance L (namely, input coordinates), an arithmetic operating process is executed by the following equation (2) on the basis of the phase delay time tp having an excellent linearity.

$$L = Vp \cdot tp + n \cdot \lambda p \qquad (2)$$

where,
  $\lambda p$: wavelength of elastic wave
  n: integer

Namely, the first term of the right side of the equation (2) shows a distance L0 in FIG. 6. A difference between the distance L to be obtained and the distance L0 is integer times as long as the wavelength as will be obviously understood from the diagram (a width T* of stairway on a time base is equal to one period of the signal waveform 44 and T*=1/frequency; when expressing by a distance, the width of stairway is equal to a wavelength $\lambda p$). Therefore, by obtaining the integer n, the distance L between the pen and the sensor can be accurately obtained. The integer n can be derived by the following equation (3) which is obtained from the equations (1) and (2).

$$n = [(Vg \cdot tg - Vp \cdot tp)/\lambda p + 1/N] + tm \qquad (3)$$

where, N is a real number other than "O" and a proper value is used. For example, now assuming that N=2, even if the linearity of the group delay time tg is not so good, so long as a generation error lies within a range of ±½ wavelength, n can be accurately determined. By substituting the value of n obtained as mentioned above into the equation (2), the distance L between the vibrator pen 3 and each of the vibration sensors 6 (6a to 6d) can be accurately measured.

As mentioned above, the distance from the input position of the coordinates by the vibrator pen 3 to each of the vibration sensors 6a to 6d can be calculated.

<Correction example of the circuit delay time>

The count value (vibration propagation time) latched by the latch includes a phase circuit delay time etp and a group circuit delay time etg (refer to FIG. 6; those times also include a time for which the vibration propagates in the pen tip 5 of the vibrator pen 3 and the like in addition to the circuit delay time). As for the errors which are caused due to them, the same amount is certainly included when the vibration is propagated from the vibrator pen 3 through the vibration propagating plate 8 and vibration sensors 6a to 6d, respectively.

Figure 7:
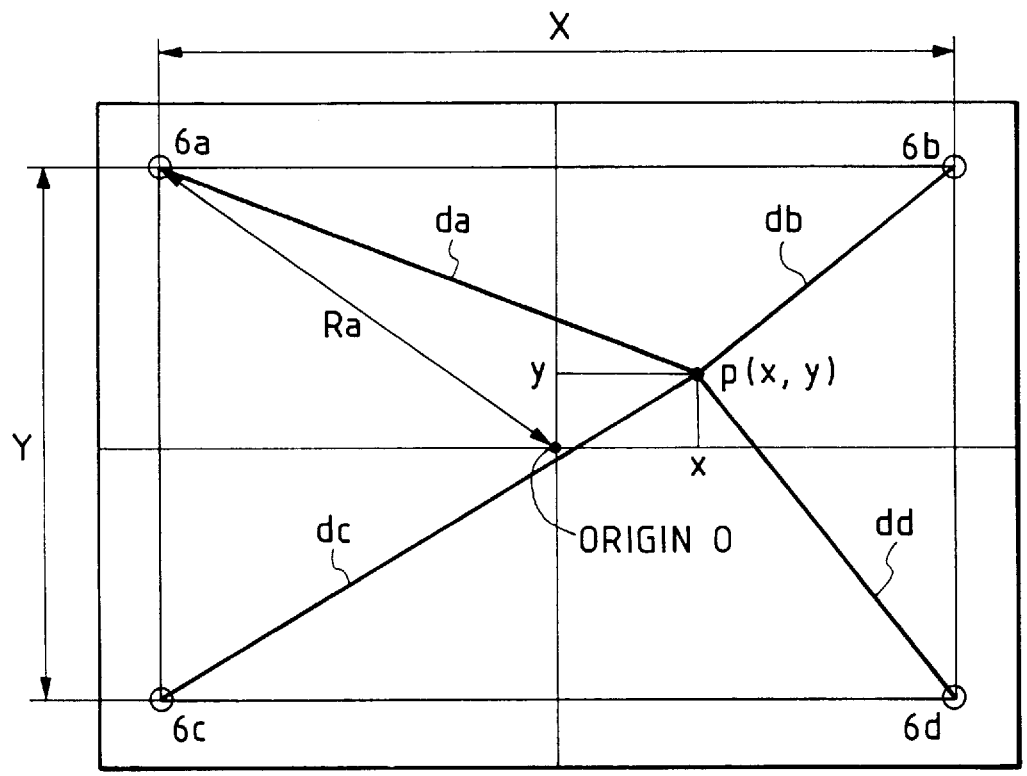
FIG. 7 is a diagram for explaining a method of calculating coordinates.

Therefore, it is now assumed that the distance from the position of an origin "O" shown in FIG. 7 to, for example, the vibration sensor 6a is set to Ra $$Ra = \{(X/2)^2 + (Y/2)^2\}^{(1/2)}$$

(refer to FIG. 7),
the vibration propagation time from the origin O to each of the vibration sensors 6 (6a to 6d) which is actually measured is set to tg0* and tp0* and a time which is required for the wave to actually propagate on the vibration propagating plate 8 from the origin O to each of the vibration sensors 6 (6a to 6d) is set to tg0 and tp0, there are the following relations.

$$tg0^* = tg0 + etg \tag{4}$$

$$tp0^* = tp0 + etp \tag{5}$$

On the other hand, now assuming that a time which is required for the wave to actually propagate on the vibration propagating plate 8 from a point P to each of the vibration sensors 6 (6a to 6d) is set to tg and tp, actual measured values tg* and tp* for an arbitrary coordinates input point P(x, y) are obtained as follows.

$$tg^* = tg + etg \tag{6}$$

$$tp^* = tp + etp \tag{7}$$

A difference between the equations (4) and (6) and a difference between the equations (5) and (7) are obtained as follows.

$$\begin{aligned} tg^* - tg0^* &= (tg + etg) - (tg0 + etg) \\ &= tg - tg0 \end{aligned} \tag{8}$$

$$\begin{aligned} tp^* - tp0^* &= (tp + etp) - (tp0 + etp) \\ &= tp - tp0 \end{aligned} \tag{9}$$

The phase circuit delay time etp and group circuit delay time etg included in the propagation times are eliminated. The true propagation delay time (the position of the vibration sensor 6a assumes a point) from the position of the origin "O" to the coordinates input point P can be obtained. By using the equations (1), (2), and (3), the difference between the distances can be obtained. Namely, the distances are calculated as follows by using the equations (1) to (3).

$$tg = tg^* - tg0^* \tag{10}$$

$$tp = tp^* - tp0^* \tag{11}$$

By adding the distance Ra from the vibration sensor 6a to the origin "O" to the values of the distance differences, the distance from the vibrator pen 3 to the vibration sensor 6a can be accurately obtained.

By previously storing the distances from the vibration sensors 6 (6a to 6d) to the origin "O" into a non-volatile memory or the like, the distances between the vibrator pen 3 and vibration sensors 6 (6a to 6d) can be determined.

The actual measured values tg0* and tp0* at the origin "O" and distances Ra to Rd (in case of the embodiment, Ra=Rb=Rc=Rd) from the vibration sensors 6 to the origin "O" are stored, for example, into a non-volatile memory at the time of shipping or the like. Prior to the calculation of the equations (1) to (3), by executing the equations (8) and (9), the measurement can be executed at a high precision.

<Calculation example of input coordinates>

A principle to calculate the coordinates inputted by the vibrator pen 3 will now be described. As shown in FIG. 7, when providing four vibration sensors 6a to 6d at four corners on the vibration propagating plate 8, straight line distances da to dd from the position P(x, y) of the vibrator pen 3 to the positions of the vibration sensors 6a to 6d can be obtained on the basis of the principle described before.

Further, the position P(x, y) of the vibrator pen 3 can be obtained on the basis of the straight line distances da to dd by the controller 1 from a theorem of three squares by the following equations.

$$x = (da + db) \cdot (da - db) / 2X \tag{12}$$

$$y = (da + dc) \cdot (da - dc) / 2Y \tag{13}$$

where,

X: distance between the vibration sensors 6a and 6b

Y: distance between the vibration sensors 6c and 6d

In this manner, the position coordinates of the vibrator pen 3 can be detected in a real-time manner.

In the above calculations, although the calculations are executed by using the distance information of up to three vibration sensors, four vibration sensors are arranged in the embodiment and the distance information which is derived with regard to the remaining vibration sensor is used to verify a certainty of the calculated coordinates. For example, it is also possible to construct in a manner such that the distance information (since the distance L increases, the detection signal level drops and a probability such that it is influenced by noises rises) of the vibration sensor in which the distance L between the pen and the sensor is largest is not used but the coordinates are calculated from the distances between the pen and the sensor with respect to the remaining three vibration sensors. In the embodiment, although the four vibration sensors are arranged and the coordinates are calculated by those vibration sensors, the coordinates can be geometrically calculated by providing two or more sensors. It is sufficient to set the number of vibration sensors in accordance with the specifications of the product.

<Second embodiment of the invention>

Figure 9:
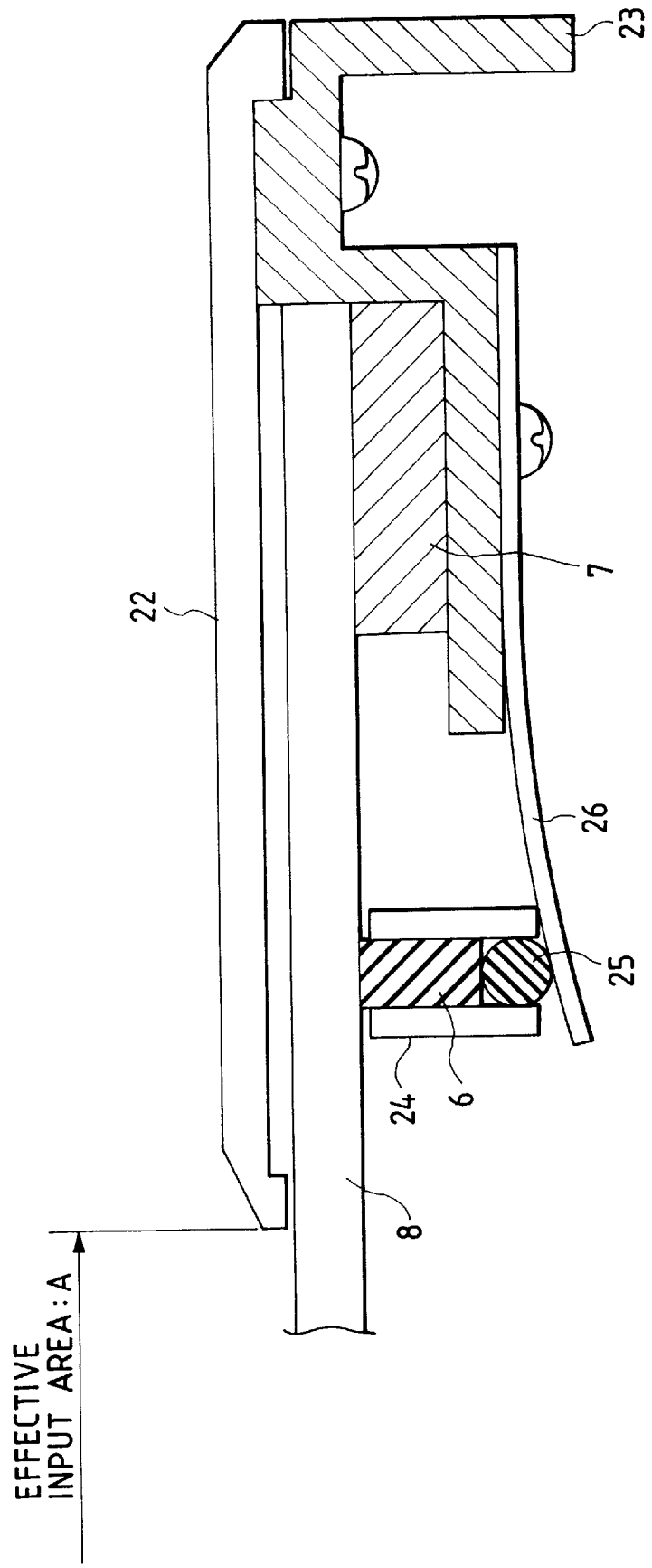
FIG. 9 is a diagram showing a cross sectional structure around a vibration sensor of a coordinate input apparatus according to the second embodiment.

FIG. 9 is a diagram showing a cross sectional structure around a vibration sensor of a coordinate input apparatus of the second embodiment. The embodiment will now be described hereinbelow with reference to FIG. 9. The embodiment relates to another structure of the electrode leading member 20 and intends to obtain an operation and an effect which are similar to those of the foregoing electrode leading member 20 by using a cylindrical ring 24 made of an ABS material or the like and a steel ball 25 (conductive material).

An inner diameter of the ring 24 is set to a value adapted to be come into engagement with the vibration sensor 6. In the example shown in the diagram, a diameter of the steel ball 25 and a diameter of the cylindrical vibration sensor 6 are set to the same value. Therefore, by arranging the ring 24, steel ball 25, vibration sensor 6, and a plate spring 26 (corresponding to the plate spring 21) having a conductivity as shown in FIG. 9, an effect similar to that in the first embodiment can be obtained. Namely, the steel ball 25 is come into engagement with the vibration sensor 6 and its location is positioned by the fixed ring 24. The position where the steel ball 25 is come into contact with the electrode of the vibration sensor 6 depends on degrees of machining precision of the vibration sensor 6, ring 24, and steel ball 25. As will be obviously understood from the foregoing description, the degrees of the machining precision can be easily accomplished as compared with the conventional leading electrode. Therefore, the cheap coordinates input apparatus having the stable performance can be mass produced.

The relation between the diameter of the steel ball 25 and the diameter of the vibration sensor 6 is not limited to that mentioned above. It is sufficient to use a structure such that a contact with the steel ball 25 can be obtained on the axis of the vibration sensor 6. Since the steel ball is arranged in order to obtain an electric conduction, it is also possible to use a resin ball coated with a conductive film.

As compared with the first embodiment, the following effects are derived according to the second embodiment. For example, in case of using a disk-shaped vibration sensor, if an electrode leading member of a shape according to the first embodiment is used, it is necessary to reduce a height of the cylindrical portion 20b of the electrode leading member 21 for positioning with the vibration sensor 6. Namely, by using a structure such that the cylindrical portion 20b is come into contact with the vibration propagating plate 8, a portion between both electrodes of the vibration sensor 6 is short-circuited (the vibration propagating plate 8 is made of a conductive material or a conductive layer is formed on the surface of the vibration propagating plate 8), so that a problem such that the sensor doesn't function as an apparatus occurs. In such a case, therefore, by using the structure of the second embodiment, its problem is solved and the coordinates input apparatus which can stably detect the coordinates can be constructed.

The invention can be applied to a system constructed by a plurality of equipment or can be also applied to a sole apparatus. The invention can be also obviously applied to a case where the invention is embodied by supplying a program to a system or an apparatus. In this case, a memory medium in which programs regarding the invention have been stored constructs the invention. By reading out the programs from the memory medium and supplying to a system or an apparatus, the system or apparatus operates by a predetermined method.

According to the invention as described above, by positioning the electrode leading member by setting a predetermined position of the vibration sensor to a reference and constructing so as to obtain an electric contact at a predetermined position of the vibration sensor, there is an effect such that the coordinates can be stably calculated at a high precision.

There are also effects such that the apparatus can be mass produced by an ordinary manufacturing apparatus having a mechanical machining precision and the apparatus can be cheaply and easily manufactured.

There is also an effect such that the influence by the fluctuation in environment such as a temperature or the like is reduced and a high precision can be maintained.

What is claimed is:

1. A coordinate input apparatus which has a vibration propagating plate and calculates a coordinate point on the vibration propagating plate pointed to by a vibration input pen using an elastic wave vibration applied by the vibration input pen to the vibration propagating plate, comprising:

vibration detection means, adhered to the vibration propagating plate, for detecting the vibration applied by the vibration input pen, said vibration detection means having an electrode;

electrode leading means for making an electrical connection with said electrode of said vibration detection means;

positioning means for providing a relative position of said electrode leading means to said vibration detection means based on an external shape of said vibration detection means; and conductive pressing means for elastically pressing said electrode leading means against said electrode of said vibration detection means, wherein an electrical signal is output from said vibration detection means through said electrode, said electrode leading means and said conductive pressing means.

2. An apparatus according to claim 1, wherein said electrode of said vibration detection means is fixed to the vibration propagating plate and another electrode is electrically connected to said vibration detection means.

3. An apparatus according to claim 2, wherein said conductive pressing means includes a spring, said spring being fixed by setting said vibration propagating plate to a reference.

4. An apparatus according to claim 3, wherein said electrode leading means and said positioning means are mechanically coupled, thereby forming an integrated shape.

5. An apparatus according to claim 2, wherein said conductive pressing means includes a spring, said spring being fixed by setting the vibration propagating plate to a reference.

6. An apparatus according to claim 5, wherein said electrode leading means and said positioning means are mechanically coupled, thereby forming an integrated shape.

7. An apparatus according to claim 2, wherein said conductive pressing means includes a spring, said spring being fixed by setting a supporting member for supporting the vibration propagating plate to a reference.

8. An apparatus according to claim 7, wherein said electrode leading means and said positioning means are mechanically coupled, thereby forming an integrated shape.

9. An apparatus according to claim 2, wherein said electrode leading means and said positioning means are mechanically coupled, thereby forming an integrated shape.

10. An apparatus according to claim 1, wherein said conductive pressing means includes a spring, said spring being fixed by setting the vibration propagating plate to a reference.

11. An apparatus according to claim 10, wherein said electrode leading means and said positioning means are mechanically coupled, thereby forming an integrated shape.

12. An apparatus according to claim 1, wherein said conductive pressing means includes a spring, said spring being fixed by setting a supporting member for supporting the vibration propagating plate to a reference.

13. An apparatus according to claim 12, wherein said electrode leading means and said positioning means are mechanically coupled, thereby forming an integrated shape.

14. An apparatus according to claim 1, wherein said vibration detection means includes a vibration sensor and said positioning means provides the relative position of said electrode leading means to said vibration detection means based on an external shape of said vibration sensor by setting a side surface of said vibration sensor to a reference.

15. An apparatus according to claim 14, wherein said positioning means provides that said electrode leading means is electrically connected to a center axis of said electrode.

16. An apparatus according to claim 15, wherein said positioning means engages with said vibration sensor.

17. An apparatus according to claim 16, wherein said vibration sensor has a cylindrical shape.

18. An apparatus according to claim 17, wherein said positioning means has a cylindrical shape adapted to engage with said vibration sensor, and said electrode leading means has a spherical shape adapted to come in contact with the inside of said cylindrical shaped positioning means.

19. An apparatus according to claim 17, wherein said electrode leading means and said positioning means are mechanically coupled, thereby forming an integrated shape.

20. An apparatus according to claim 16, wherein said vibration sensor has a prismatic shape.

21. An apparatus according to claim 20, wherein said electrode leading means and said positioning means are mechanically coupled, thereby forming an integrated shape.

22. An apparatus according to claim 14, wherein said electrode leading means and said positioning means are mechanically coupled, thereby forming an integrated shape.

23. An apparatus according to claim 15, wherein said electrode leading means and said positioning means are mechanically coupled, thereby forming an integrated shape.

24. An apparatus according to claim 16, wherein said electrode leading means and said positioning means are mechanically coupled, thereby forming an integrated shape.

25. An apparatus according to claim 1, wherein said electrode leading means and said positioning means are mechanically coupled, thereby forming an integrated shape.

26. A vibration detecting apparatus having a vibration propagating plate and detects an elastic wave vibration applied by the vibration input pen to the vibration propagating plate, comprising:

vibration detection means, adhered to the vibration propagating plate, for detecting the vibration applied by the vibration input pen, said vibration detection means including an electrode and a vibration sensor;

electrode leading means for making an electrical connection with said electrode of said vibration detection means;

positioning means for providing a relative position of said electrode leading means to said vibration detection means based on an external shape of said vibration sensor; and conductive pressing means for elastically pressing said electrode leading means against said electrode of said vibration detection means, wherein an electrical signal is output from said vibration detection means through said electrode, said electrode leading means and said pressing means.

27. An apparatus according to claim 26, wherein said positioning means providing the relative position of said electrode leading means to said vibration detection means based on the external shape of said vibration sensor by setting a side surface of said vibration sensor to a reference.

28. An apparatus according to claim 27, wherein said positioning means provides that said electrode leading means is electrically connected to a center axis of said electrode.

29. An apparatus according to claim 28, wherein said positioning means engages with said vibration sensor.

30. An apparatus according to claim 29, wherein said vibration sensor has a cylindrical shape.

31. An apparatus according to claim 30, wherein said electrode leading means and said positioning means are mechanically coupled, thereby forming an integrated shape.

32. An apparatus according to claim 30, wherein said positioning means has a cylindrical shape adapted to engage with said vibration sensor, and said electrode leading means has a spherical shape adapted to come in contact with the inside of said cylindrical shaped positioning means.

33. An apparatus according to claim 29, wherein said vibration sensor has a prismatic shape.

34. An apparatus according to claim 33, wherein said electrode leading means and said positioning means are mechanically coupled, thereby forming an integrated shape.

35. An apparatus according to claim 29, wherein said electrode leading means and said positioning means are mechanically coupled, thereby forming an integrated shape.

36. An apparatus according to claim 26, wherein said electrode leading means and said positioning means are mechanically coupled, thereby forming an integrated shape.

37. An apparatus according to claim 27, wherein said electrode leading means and said positioning means are mechanically coupled, thereby forming an integrated shape.

38. An apparatus according to claim 28, wherein said electrode leading means and said positioning means are mechanically coupled, thereby forming an integrated shape.

* * * * *

UNITED STATES PATENT AND TRADEMARK OFFICE
CERTIFICATE OF CORRECTION

PATENT NO. : 5,842,153  Page 1 of 3

DATED : November 24, 1998

INVENTOR(S): KATSUYUKI KOBAYASHI ET AL.

It is certified that error appears in the above-identified patent and that said Letters Patent is hereby corrected as shown below:

On title page, item

[56] REFERENCES CITED

Foreign Patent Documents
   "64068823  3/1989 Japan" should read --64-68823
      3/1989 Japan--.

[57] ABSTRACT

Line 11, "reference" should read --reference and--.
   Line 12, "be" should be deleted.

COLUMN 1

Line 45, "is come into" should read --comes in--.

COLUMN 2

Line 55, "coordinatecalculating" should read
      --coordinate-calculating--.

COLUMN 3

Line 60, "cross sectional" should read
      --cross-sectional--.

UNITED STATES PATENT AND TRADEMARK OFFICE
CERTIFICATE OF CORRECTION

PATENT NO. : 5,842,153

DATED : November 24, 1998

INVENTOR(S): KATSUYUKI KOBAYASHI ET AL.

It is certified that error appears in the above-identified patent and that said Letters Patent is hereby corrected as shown below:

COLUMN 4

Line 15, "cross sectional" should read
        --cross-sectional--.
    Line 30, "cross sectional" should read
        --cross-sectional--.

COLUMN 6

Line 16, "cross sectional" should read
        --cross-sectional--.
    Line 26, "be" should be deleted.
    Line 30, "come" should be deleted.
    Line 42, "be" should be deleted.
    Line 50, "be" should be deleted.

COLUMN 7

Line 12, "be" should be deleted.
    Line 17, "be" should be deleted.

COLUMN 8

Line 58, "be" should be deleted.

UNITED STATES PATENT AND TRADEMARK OFFICE
CERTIFICATE OF CORRECTION

PATENT NO. : 5,842,153

DATED : November 24, 1998

INVENTOR(S) : KATSUYUKI KOBAYASHI ET AL.

It is certified that error appears in the above-identified patent and that said Letters Patent is hereby corrected as shown below:

COLUMN 14

Line 34, "cross sectional" should read
 --cross-sectional--.
Line 45, "be" should be deleted.

Signed and Sealed this

Second Day of November, 1999

Attest:

Q. TODD DICKINSON

Attesting Officer

Acting Commissioner of Patents and Trademarks